(12) United States Patent
Kim et al.

(10) Patent No.: US 7,811,124 B2
(45) Date of Patent: Oct. 12, 2010

(54) COMMUNICATION TERMINAL

(75) Inventors: Jang Ho Kim, Suwon-si (KR); Kwan Hee Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 273 days.

(21) Appl. No.: 11/936,545

(22) Filed: Nov. 7, 2007

(65) Prior Publication Data

US 2008/0124982 A1    May 29, 2008

(30) Foreign Application Priority Data

Nov. 23, 2006   (KR) .................... 10-2006-0116424
Nov. 23, 2006   (KR) .................... 10-2006-0116492

(51) Int. Cl.
*H01R 9/05* (2006.01)
(52) U.S. Cl. ..................................... 439/578
(58) Field of Classification Search ......... 439/578–581, 439/675
See application file for complete search history.

(56) References Cited

U.S. PATENT DOCUMENTS

| 4,241,973 | A | * | 12/1980 | Mayer et al. ................. 439/581 |
| 5,304,739 | A | * | 4/1994 | Klug et al. ................ 174/102 R |
| 5,809,403 | A | * | 9/1998 | MacDonald et al. ...... 455/575.7 |
| 6,144,399 | A | * | 11/2000 | Manchester et al. .......... 725/127 |
| 2008/0081505 | A1 | * | 4/2008 | Ou et al. ...................... 439/374 |

FOREIGN PATENT DOCUMENTS

| CN | 2456274 Y | 10/2001 |
| CN | 1819335 A | 8/2006 |

* cited by examiner

*Primary Examiner*—Javaid Nasri
(74) *Attorney, Agent, or Firm*—Birch, Stewart, Kolasch & Birch, LLP (57) ABSTRACT

According to an embodiment, a communication terminal is discussed, by which a coaxial cable capable of carrying a pair of signals is provided to the communication terminal and by which the case performs a grounding function for the coaxial cable to enhance the grounding function.

21 Claims, 7 Drawing Sheets

COMMUNICATION TERMINAL

This application claims the priority benefit of the Korean Patent Application No. 10-2006-0116492, filed on Nov. 23, 2006 and No. 10-2006-0116424, filed on Nov. 23, 2006, which are hereby incorporated by reference as if fully set forth herein.

BACKGROUND OF THE INVENTION

1. Field of the Invention

The present invention relates to a communication terminal. Although the present invention is suitable for a wide scope of applications, it is particularly suitable for providing a coaxial cable capable of carrying two kinds of signals or enabling a whole case to perform a ground function.

2. Discussion of the Related Art

Generally, a communication terminal is a portable device personally carried to perform at least one of an audio/video communication function, an information inputting/outputting function, a data storing function, and the like.

As a communication terminal gets more diversified in functionality, the communication terminal becomes equipped with complicated functions including picture or moving picture photographing, music or moving picture file playback, game play, broadcast reception, etc. And, the communication terminal is implemented as an all-around multimedia player.

To implement the complicated functions, various new trials are applied to the multimedia player in aspect of hardware or software. For instance, a user interface environment is provided to facilitate a user to search or select a specific function.

As a communication terminal tends to be regarded as a personal belonging used to express the user's personality, a design of the communication terminal needs to be diversified.

The communication terminal generally includes a PCB (printed circuit board) loaded with various semiconductor devices implementing various functions of the communication terminal. The PCB receives data from a wireless communication unit, processes the received data, and then transfers output data to various modules of an output unit. So, power and the like necessary for the data processing are provided to the PCB by a power supply unit.

Since the locations of the wireless communication unit, the power supply unit and the like are limited, the wireless communication unit, the power supply unit and the PCB are connected via a coaxial cable in general.

A coaxial cable of a related art consists of a first conducting wire carrying an electric signal, an inner insulating layer enclosing the first conducting wire to insulate, a second conducting wire cutting off an external electric wave and the like not to be introduced into the first conducting wire, an outer insulating layer protecting the second conducting wire.

The coaxial cable plays a role in enabling positions, which are spaced apart from each other within a communication terminal or the like, to electrically communicate with each other. The positions, which are to communicate with other, communicate with each other via the first conducting wire. And, the second conducting wire is installed to communicate with a ground portion on a PCB for grounding.

However, the above-explained related art is unable to avoid the following problems and limitations.

First of all, in the related art, a coaxial cable connects an antenna and a PCB together to transfer an electric (electrical) signal. In case of attempting to send a different electric signal, a separate cable is needed to send the different electric signal. In particular, the second conducting wire of the related art coaxial cable is connected to the ground but is not used as a path for carrying the electric signal. So, a separate coaxial cable is added according to an electric signal type to carry the specific type of electric signal.

Secondly, the second conducting wire of the related art coaxial cable is connected to the ground part on the PCB to be grounded. Yet, an external electric wave is not smoothly cut off. So, an error is generated from the electric signal flowing though the corresponding conducting wire.

SUMMARY OF THE INVENTION

Accordingly, the present invention is directed to a communication terminal that substantially obviates one or more problems due to limitations and disadvantages of the related art.

An object of the present invention is to provide a communication terminal, by which a coaxial cable capable of carrying a pair of signals is provided to the communication terminal.

Another object of the present invention is to provide a communication terminal, by which a whole case performs a grounding function for a coaxial cable to enhance the grounding function.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication terminal according to an embodiment of the present invention includes a coaxial cable including a first connecting wire, an inner insulating layer configured to enclose the first connecting wire, a second connecting wire enclosing the inner insulating layer, and an outer insulating layer configured to enclose the second connecting wire in a manner of exposing a portion of the second connecting wire and a case having an inner face contacted with the exposed portion of the second connecting wire in part.

Preferably, the coaxial cable is configured to electrically connect a PCB part loaded with various electronic parts therein and a wireless communication unit including an antenna together.

Preferably, a plurality of penetration holes configured to be penetrated in a longitudinal direction are further provided to the inner insulating layer of the coaxial cable and a plurality of the penetration parts are filled up with air.

Preferably, at least one recessed portion is formed on the outer insulating layer to expose the portion of the second connecting wire externally and at least one fixing portion is provided to the case to fix the coaxial cable thereto by being fitted into the at least one recessed portion.

Preferably, a recessed portion is formed on the outer insulating layer to expose the portion of the second connecting wire externally and a fixing portion is provided to the case to fix the coaxial cable thereto by being fitted into the recessed portion.

Preferably, the fixing portion is integrally formed with the case and the case is formed of a metal based material having good electric conductivity.

In another aspect of the present invention, a communication terminal includes a coaxial cable assembly including a first connecting wire, an inner insulating layer configured to enclose the first connecting wire, a second connecting wire enclosing the inner insulating layer, an outer insulating layer configured to enclose the second connecting wire in a manner of exposing a portion of the second connecting wire, and a circuit part connected to the second connecting wire to cut of electric waves.

Preferably, the first connecting wire electrically connects a wireless communication unit including an antenna and a PCB part loaded with various electronic parts together and the second connecting wire electrically connects a power supply unit and the PCB part together.

Preferably, the circuit part includes a grounding part connected to the second connecting wire to ground the second connecting wire and a capacitor provided between the second connecting wire and the grounding part.

Preferably, a plurality of penetration holes configured to be penetrated in a longitudinal direction are formed in the inner insulating layer and a plurality of the penetration parts are filled up with air.

Preferably, a plurality of penetration holes configured to be penetrated in a longitudinal direction are formed in the inner insulating layer and a plurality of the penetration parts are filled up with air.

Preferably, a signal carried by the first connecting wire is an RF signal and a signal carried by the second connecting wire is a power signal.

Preferably, a signal carried by the first connecting wire is an RF signal and a signal carried by the second connecting wire is a power signal.

Preferably, the circuit part further includes a connecting portion between the second connecting wire and the capacitor and a different wire is connected in parallel to the connecting portion.

Therefore, the present invention enables at least two kinds of electric signals can be carried by a single coaxial cable or a coaxial cable assembly.

And, the present invention enables a whole case to work as a grounding part to avoid a separate grounding part.

According to one aspect, the invention provides a communication terminal comprising: a coaxial cable comprising: a first connecting wire, an inner insulating layer configured to enclose at least a part of the first connecting wire, a second connecting wire configured to enclose at least a part of the inner insulating layer, and an outer insulating layer configured to enclose at least a part of the second connecting wire and to expose a portion of the second connecting wire; and a case having a part in contact with the exposed portion of the second connecting wire.

According to another aspect, the invention provides a communication terminal including a coaxial cable assembly, the coaxial cable assembly comprising: a first connecting wire; an inner insulating layer configured to enclose at least a part of the first connecting wire; a second connecting wire configured to enclose at least a part of the inner insulating layer; an outer insulating layer configured to enclose at least a part of the second connecting wire; and at least one circuit part connected to the second connecting wire to cut of electric waves.

According to another aspect, the invention provides a mobile terminal comprising: a case including a plurality of electronic components therein; and at least one coaxial cable including: a first connecting wire configured to carry a first type electrical signal between two of the electronic components, an insulating layer configured to surround substantially the first connecting wire, and a second connecting wire configured to surround substantially the insulating layer and to carry a second type electrical signal different from the first type electrical signal between two of the electronic components.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

First of all, a communication terminal according to preferred embodiments) of the present invention is explained in aspect of elements according to functions.

Figure 1:
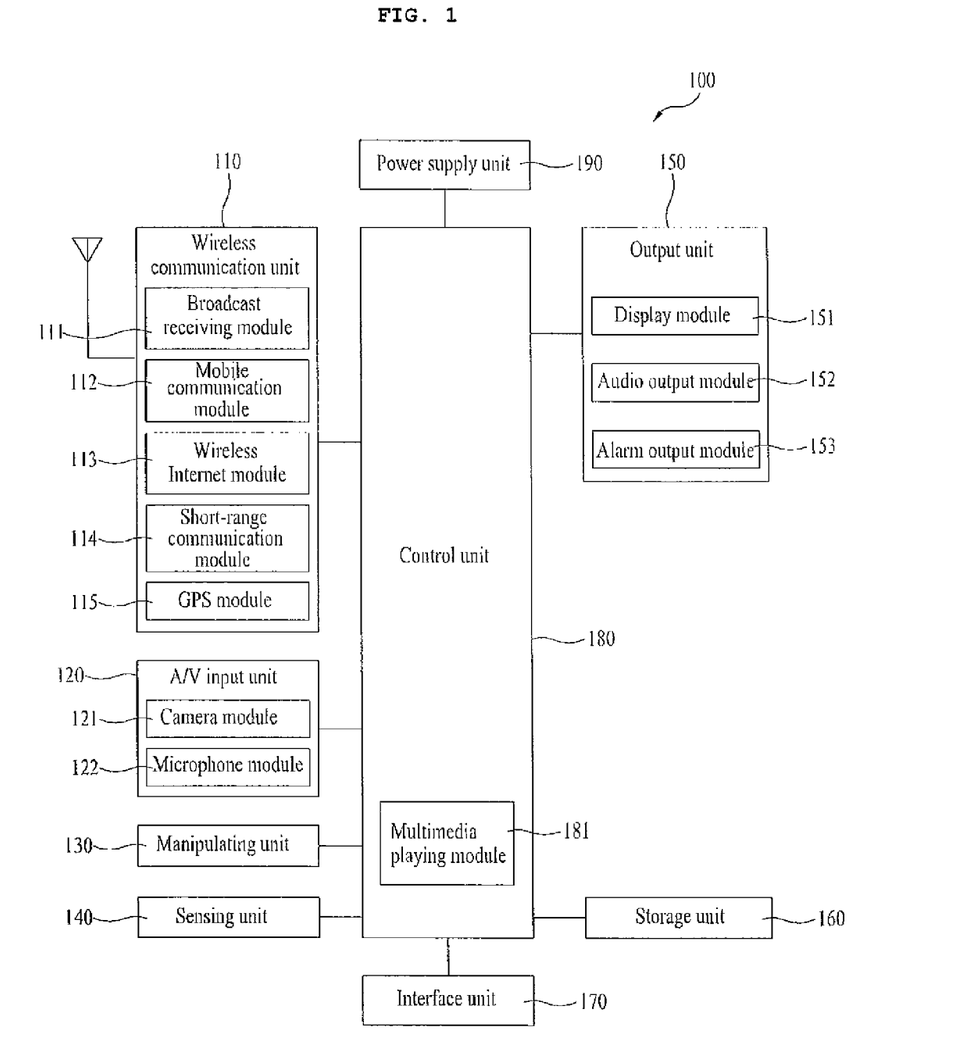
FIG. 1 is a block diagram of a communication terminal according to one embodiment of the present invention.

FIG. 1 is a block diagram of a communication terminal according to one embodiment of the present invention.

Referring to FIG. 1, a communication terminal 100 includes a wireless communication unit 110, an A/V (audio/video) input unit 120, a manipulating unit 130, a sensing unit 140, an output unit 150, a storage unit 160, an interface unit 170, a control unit 180, a power supply unit 190, and the like. In implementing the respective elements for real application, it is understood that at least two of the elements can be combined into one or one element can be subdivided into at least two elements. The communication terminal 100 can include other components. All components of the communication terminal 100 are operatively coupled and configured.

The above elements are explained one by one as follows.

First of all, the wireless communication unit 110 includes a broadcast receiving module 111, a mobile communication module 112, a wireless Internet module 113, a short-range communication module 114, and a GPS module 115.

The broadcast receiving module 111 receives a broadcast signal and/or broadcast associated information from an external broadcast managing server via a broadcast channel. The broadcast channel can include one of a satellite channel and a terrestrial channel. The broadcast managing server preferably means a server that generates and/or transmits a broadcast signal and/or broadcast associated information or a server that receives and/or transmits a previously generated broadcast signal and/or broadcast associated information to a terminal.

The broadcast associated information may mean information associated with a broadcast channel, a broadcast program or a broadcast service provider. The broadcast signal can include at least one of a TV broadcast signal, a radio broadcast signal, and a data broadcast signal. And, the broadcast signal can further include a broadcast signal having a data broadcast signal combined with a TV or radio broadcast signal.

Meanwhile, the broadcast associated information can be provided via a mobile communication network or other network. If so, the broadcast associated information can be received by the mobile communication module 112.

The broadcast associated information can exist in various forms. For instance, the broadcast associated information can exist in such a format as EPG (electronic program guide) of DMB (digital multimedia broadcasting), ESG (electronic service guide) of DVB-H (digital video broadcast-handheld), etc.

The broadcast receiving module 111 receives broadcast signals using various broadcasting systems. In particular, the broadcast receiving module 111 can receive a digital broadcast signal using such a digital broadcasting system as DMB-T (digital multimedia broadcasting-terrestrial), DMB-S (digital multimedia broadcasting-satellite), Media-FLO (media forward link only), DVB-H (digital video broadcast-handheld), ISDB-T (integrated services digital broadcast-terrestrial), and the like.

Of course, the broadcast receiving module 111 is configured suitable for all kinds of broadcasting systems for providing broadcast signals as well as the above-explained digital broadcasting systems.

The broadcast signal and/or broadcast associated information, received via the broadcast receiving module 111, can be stored in the storage unit 160.

The mobile communication module 112 transmits/receives wireless signals to/from at least one of a base station, an external terminal, and a server on a mobile communication network or other network. In this case, the wireless signals can include at least one of an audio signal, a video communication call signal, and data variously formatted according to character/multimedia message transmission and reception.

The wireless internet module 113 preferably can be a module for providing wireless internet access. And, the wireless internet module 113 can be provided within or outside the communication terminal 100.

The short-range communication module 114 preferably is a module for providing short-range communication. As the short-range communication technology, Bluetooth, RFID (radio frequency identification), IrDA (infrared data association), UWB (ultra-wideband), ZigBee or the like can be used.

And, the GPS (global positioning system) module 115 receives position information and other data from a plurality of satellites.

Meanwhile, the A/V (audio/video) input unit 120 is provided for audio and/or video signal input and can include a camera module 121, a microphone module 122, and the like. The camera module 121 processes an image frame of a still picture or moving picture obtained in a video communication mode or a photographing mode by an image sensor. And, the processed image frame can be displayed by a display module 151 of the output unit 150.

The image frame processed by the camera module 121 is stored in the storage unit 160 or can be externally transmitted via the wireless communication unit 110. Optionally, at least two camera modules 121 can be provided according to a configuration of the terminal.

The microphone module 122 receives an external audio signal via a microphone in a phone call mode, a recording mode, a voice recognition mode or the like, and then processes the received signal into electrical audio data. In case of the phone call mode, the processed audio data is converted into a transmittable format via the mobile communication module 112 and then outputted to a mobile communication base station. The microphone module 122 can implement various kinds of noise removing algorithms to remove noise generated in the course of receiving the external audio signal. In addition to or in lieu of the microphone module 122, other types of audio input unit may be used.

The manipulating unit (e.g., user input unit) 130 generates key input data inputted for an operational control of the terminal by a user. The manipulating unit 130 can include at least one of a keypad, a dome switch, a touchpad (static pressure/capacitance), a jog wheel, a jog switch, and the like. In particular, the touchpad configures a mutual layer structure in cooperation with the display module 151, which will be explained later, to be implemented into a touchscreen.

The sensing unit 140 senses a current status of the communication terminal 100 such as an open/close status of the communication terminal 100, a position of the communication terminal 100, a presence or non-presence of a user's touch and the like, and then accordingly generates a sensing signal for controlling an operation of the communication terminal 100.

For instance, if the communication terminal 100 is a slide type phone, the sensing unit 140 is capable of sensing whether the slide phone is open or closed. And, the sensing unit 140 is responsible for sensing the functions associated with a presence or non-presence of power supply by the power supply unit 190, a presence or non-presence of connection between the interface unit 170 and an external device, and the like.

The interface unit 170 plays a role in coupling the communication terminal 100 with external devices. For instance, examples of the external devices can include, but are not limited to, wire/wireless headphones, external chargers, wire/wireless data ports, card sockets (e.g., memory card socket, SIM/UIM card socket), audio I/O (input/output) ports, video I/O (input/output) ports, earphones, etc.

The interface unit 170 receives data or is supplied with power from an external device and then delivers the received data or power to the corresponding element(s) of the communication terminal 100. And, the interface unit 170 enables data within the communication terminal 100 to be transferred to an external device.

The output unit 150 is provided to output audio, video and alarm signals as well as any other information or data. The output unit 150 can include the display module 151, an audio output module 152, an alarm output module 152, and the like.

The display module 151 displays information processed by the communication terminal 100. For instance, if the communication terminal 100 is in a phone call mode, the display module 151 displays UI (user interface) or GUI (graphic user interface) associated with a phone call. If the communication terminal 100 is in a video call mode or a photographing mode, the display module 151 displays a photographed and/or received image or the UI or GUI.

As mentioned in the foregoing description, in case that the display module 151 and the touchpad construct the mutual layer structure to configure a touchscreen, the display module 151 can be used as an input device as well as an output device.

The display module 151 can include at least one of a liquid crystal display, a thin film transistor-liquid crystal display, an organic light-emitting diode display, a flexible display, a 3-dimensional display, a CRT, and the like.

And, there can exist at least two display modules 151 according to the implementation of the communication terminal 100. For instance, the communication terminal 100 can be provided with both an external display module and an internal display module.

The audio output module 152 outputs audio data, which is received from the wireless communication unit 110 or stored in the storage unit 160, in one of a call signal receiving mode, a phone call mode, a recording mode, a voice recognition mode, a broadcast reception mode, and the like.

And, the audio output module 152 outputs an audio signal (e.g., call signal received sound, message received sound, etc.) associated with a function executed by the communication terminal 100. Moreover, the audio output module 152 can include at least one of a speaker, a buzzer, and the like.

The alarm output module 153 outputs a signal for announcing an event occurrence of the communication terminal 100. Events occurring in the communication terminal include a call signal reception, a message reception, a key signal input, and the like.

The alarm output module 153 is able to output a signal for announcing an event occurrence in a form different from that of an audio or video signal. For instance, the alarm output module 153 can output a signal in a form of vibration.

If an alarm call signal or a message is received, the alarm output module 153 can output vibration to announce the reception of the call signal or the message. If a key signal is inputted, the alarm output module 153 is able to output vibration as a feedback for the key signal input.

Through the vibration outputs, a user is able to recognize the event occurrences. Of course, a signal for announcing an event occurrence can be outputted via the display module 151 and/or the audio output module 152.

The storage unit 160 can store data and programs for processing and controlling the operations of the communication terminal 100 and is able to execute a function of storing input/output data (e.g., phonebook, message, still picture, moving picture, etc.) temporarily.

The storage unit 160 includes at least one storage medium corresponding to a flash memory, a hard disc, a multimedia card micro-type memory, a card type memory (e.g., SD memory, XD memory, etc.), a RAM, a ROM, and the like.

And, the communication terminal 100 may manage a web storage for performing a storage function of the storage unit 150 on the Internet or other network such as intranet, extranet, etc.

The control unit 180 controls the overall operations of the communication terminal. For instance, the control unit 180 performs the control and processing associated with voice phone call, data communication, video call and the like. And, the control unit 180 can include a multimedia playing module 181 for multimedia playback and/or recording.

In this case, the multimedia playing module 181 can include hardware within the control unit 180 and/or software separate from the control unit 180.

And, the power supply unit 190 receives an external or internal power and then supplies the received power necessary for the operations of the respective elements, under the control of the control unit 180.

In the above description, the communication terminal according to the present invention is observed in aspect of the elements according to its functions. And, the communication terminal according to an embodiment of the present invention will be explained in aspect of elements according to its exterior with further reference to FIG. 2 and FIG. 3 as follows.

The present invention is applicable to various communication terminals such as a folder type communication terminal, a bar type communication terminal, a swing type communication terminal, a slider type portable, and the like. Further, some examples of the communication terminal include, but are not limited to, a mobile phone, a smart device, a computer notebook, a PDA, etc.

For convenient and concise explanation of the present invention, the slider type communication terminal is taken as an example for an embodiment of the present invention in the following description. Namely, the present invention is not limited to the slider type communication terminal only but applicable to the various types of the communication terminals.

Figure 2:
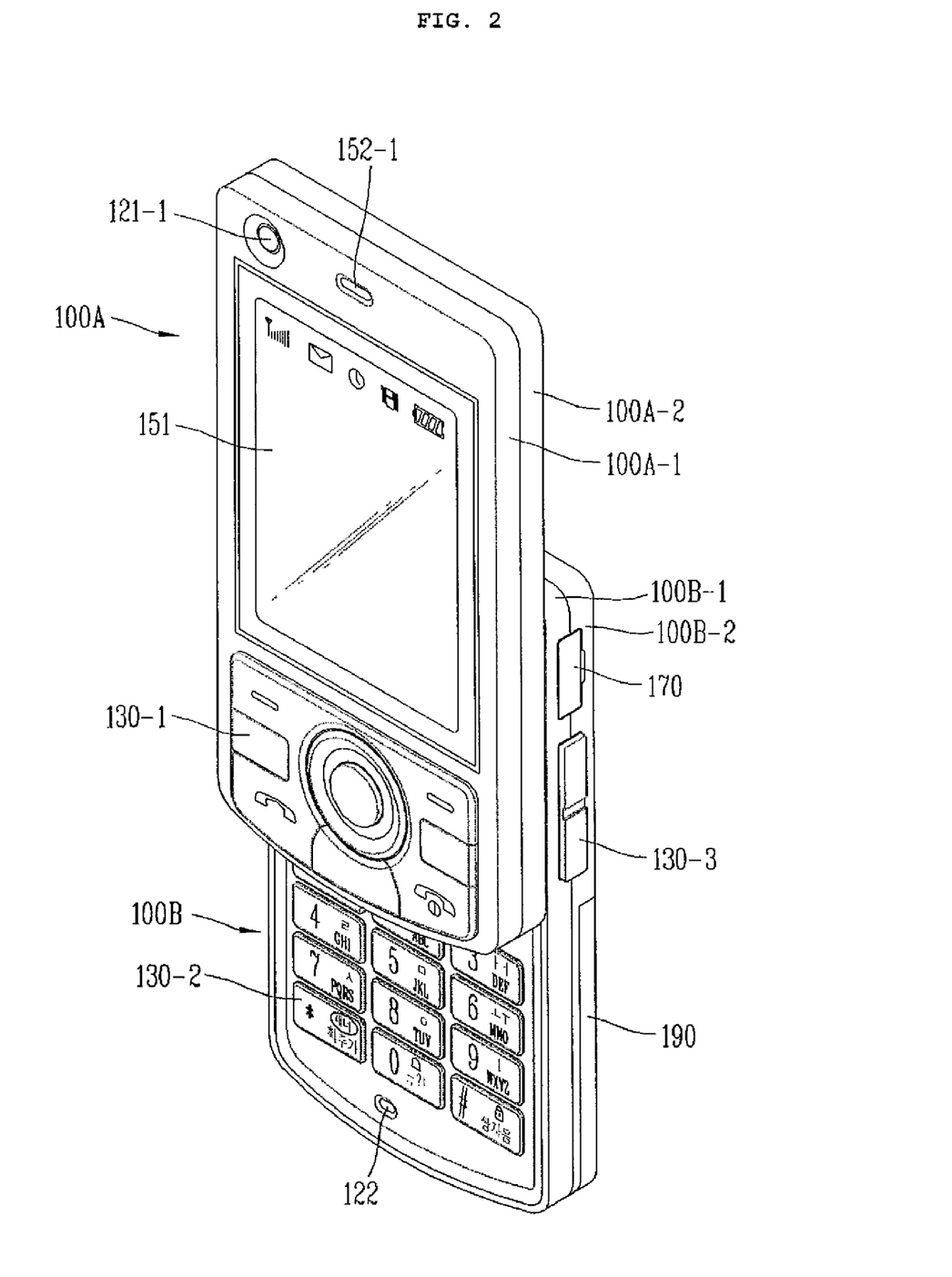
FIG. 2 is a front perspective diagram of a communication terminal according to one embodiment of the present invention.

FIG. 2 is a front perspective diagram of a communication terminal according to one embodiment of the present invention.

Referring to FIG. 2, a communication terminal according to one embodiment of the present invention includes a first body 100A and a second body 100B configured slidable on the first body 100A in at least one direction.

The first body 100A is placed over the second body 100B, which can be referred to as a closed configuration. And, the first body 100A, as shown in FIG. 2, is placed to expose at least one portion of the second body 100B, which can be referred to as an open configuration.

The communication terminal is normally operative in the closed configuration to work in a standby mode that can be released by a user's manipulation. The communication terminal is normally operative in the open configuration to work in a phone call mode or the like. Yet, the communication terminal enters a standby mode according to a user's manipulation or after prescribed duration.

A case (casing, housing, cover, etc.) configuring an exterior of the first body 100A includes a first front case 100A-1 and a first rear case 100A-2. Various electronic parts are loaded in a space constructed by the first front case 100A-1 and the first rear case 100A-2. Optionally, at least one or more intermediate cases can be provided between the first front case 100A-1 and the first rear case 100A-2 in addition.

In particular, the cases can be formed of synthetic resin by injection molding or formed of a metal based material containing stainless steel (STS), titanium (Ti) or the like.

The first body 100A, and more particularly, the first front case 100A-1 can be provided with a display module 151, a first audio output module 152-1, a first camera module 121-1, and a first manipulating unit 130-1.

The display module 151 includes an LCD (liquid crystal display), an OLED (organic light emitting diodes) or the like to visually represent information thereon.

If a touchpad is overlapped with the display module 151 to configure a layer structure, the display module 151 works as a touchscreen. So, a user can touch the display module 151 to enable an information input.

The first audio output module 152-1 can be implemented into a receiver or a speaker.

The first camera module 121-1 can be implemented to facilitate a user to capture an image or a moving picture.

Like the first body 100A, a case, which configures an exterior of the second body 100B, is constructed with a second front case 100B-1 and a second rear case 100B-2.

In particular, a second manipulating unit 130-2 can be provided to a front face of the second front case 100B-1.

And, a third manipulating unit 130-3, a microphone module 122, and an interface unit 170 can be provided to at least one of the second front case 100B-1 and the second rear case 100B-2.

The first to third manipulating units 130-1, 130-2 and 130-3 can be referred to as a manipulating unit 130. Every tactile manner of enabling a user to perform manipulation with a tactile sense can be adopted as the manipulating unit.

For instance, the manipulating unit 130 can be implemented with a dome switch which can receive a command or information by a user's push manipulation, a touchpad which receives a command or information by a user's touch manipulation, a wheel for rotating a key, a jog shuttle or a joystick by a user's manipulation, or the like.

In aspect of functionality, the first manipulating unit 130-1 is provided to input such a command as a start, an end, a scroll, and the like and the second manipulating unit 130-2 is provided to input numerical figures, characters, symbols, and the like.

And, the third manipulating unit 130-3 can operate as a hotkey to activate special function(s) within the communication terminal.

The microphone module 122 can be implemented into a configuration suitable for receiving a user's voice or other sounds.

The interface unit 170 is a path for enabling the communication terminal of the present invention to exchange data with an external device.

For instance, the interface unit 170 can include at least one of a connecting port for wire/wireless connection to an earphone, a port for short-range communication (e.g., IrDA port, Bluetooth port, a wireless LAN port, etc.), and a power supply port for supplying power to the communication terminal.

The interface unit 170 can include a card socket for receiving an external card such as SIM (subscriber identification module), UIM (user identify module), and a memory card for information storage.

Preferably a power supply unit 190 is loaded in the second rear case 100B-2 to supply power to the communication terminal.

And, the power supply unit 190, for example, includes a chargeable battery and can be detachably attached for battery charging.

Figure 3:
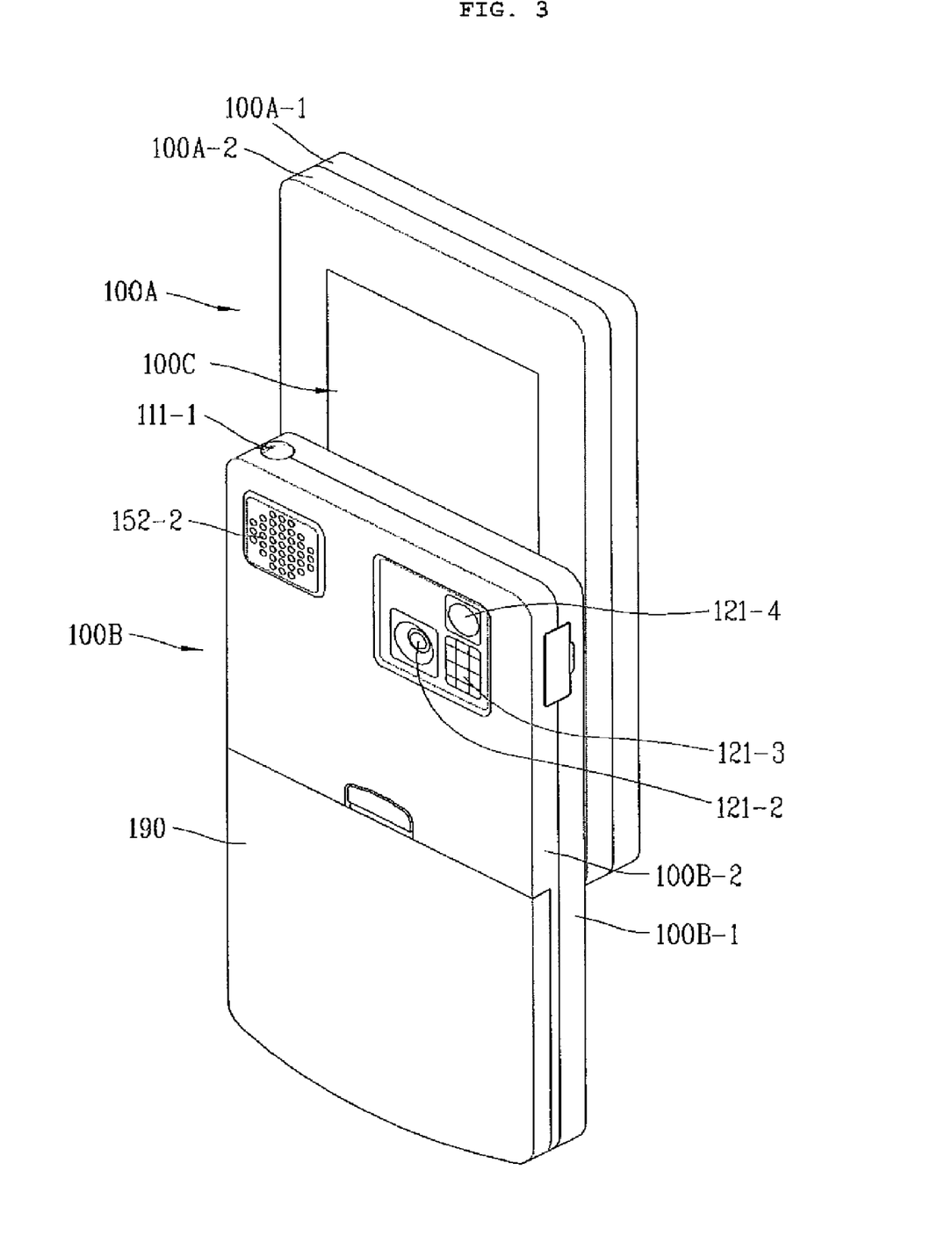
FIG. 3 is a rear perspective diagram of a communication terminal according to one embodiment of the present invention.

FIG. 3 is a rear perspective diagram of an example of the communication terminal shown in FIG. 2 according to an embodiment of the invention.

Referring to FIG. 3, a second camera module 121-2 can be additionally provided to a rear face of the second rear case 100B-2. The second camera module 121-2 has a photographing direction substantially opposite to that of the first camera module ('121-1': cf. FIG. 1) and can have pixels differing from those of the first camera module.

For instance, the first camera module 121-1 has low pixels enough to transmit a user's captured face to a correspondent side in video communication. The second camera module 121-2 preferably includes high pixels because a captured subject is not immediately transmitted in general. Other variations are also possible.

A flash 121-3 and a mirror 121-4 can be additionally provided in the vicinity of the second camera module 121-2. In case that a subject is photographed by a user using the second camera module 121-2, the flash 121-3 can be configured to flash light on the subject. The mirror 121-4 enables a user to look at his face and the like in case of attempting to self-photograph himself.

A second audio output module 152-2 can be additionally provided to the second rear case 100B-2.

The second audio output module 152-2 can implement a stereo function together with the first audio output module (e.g., element 152-1 in FIG. 2) and can be used for conversation in a speakerphone mode.

One portion of a slide module 100C, which enables the first and second bodies 100A and 100B to be slidably assembled, is provided to the first rear case 100A-2 of the first body 100A. And, the other portion of the slide module 100C is provided to the second front case 100B-1 of the second body 100B not to be externally exposed as shown in the drawing.

In the above description, the second camera module 121-2 or the like is provided to the second body 100B, by which the present invention is not limited. For instance, at least one of the elements 111-1, 121-2, 121-3 and 152-2 provided to the second rear case 100B-2 such as the second camera module 121-2 can be provided to the first body 100A, and more particularly, to the first rear case 100A-2.

If so, it is advantageous that the element(s) provided to the first rear case 100A-2 is protected in a closed configuration. Moreover, even if the second camera module 121-2 is not additionally provided, the first camera module 121-1 can be rotatably provided to enable photographing in the photographing direction of the second camera module 121-2.

A PCB (printed circuit board), in which various chips for implementing the functions of the communication terminal, is built or installed in the communication terminal 100. And, the PCB can be provided within a backside cover.

Data is provided from a wireless communication unit such as the wireless communication unit 110. And, the PCB processes the data and then transfers output data to various modules of an output unit such as the output unit 150. So, electrical current required for processing data should be supplied by a power supply unit. The wireless communication unit, the power supply unit and the PCB, which are spaced from each other, are connected to each other via coaxial cables.

Figure 4:
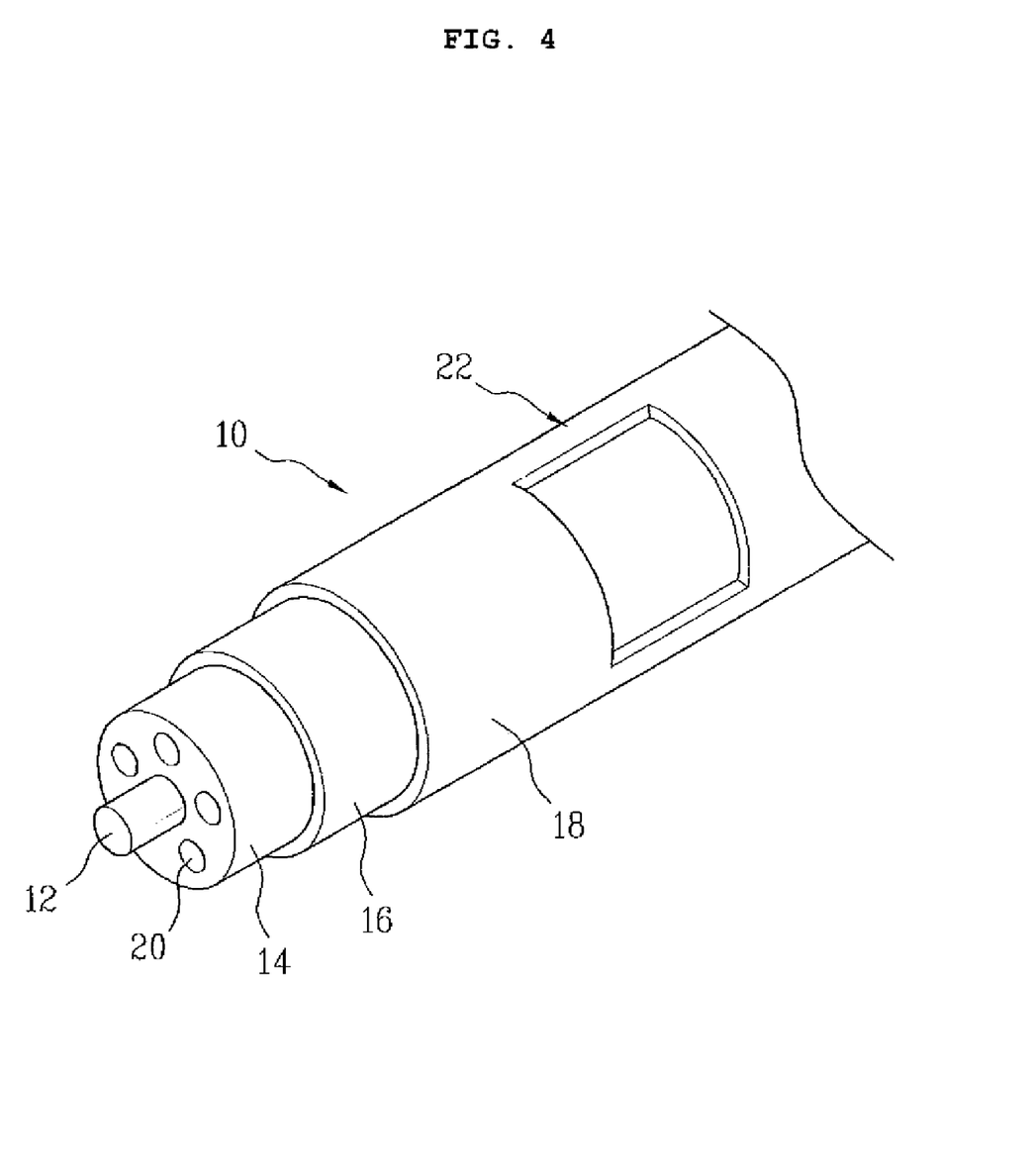
FIG. 4 is a perspective diagram of a coaxial cable provided to a communication terminal according to one embodiment of the present invention.
Figure 5:
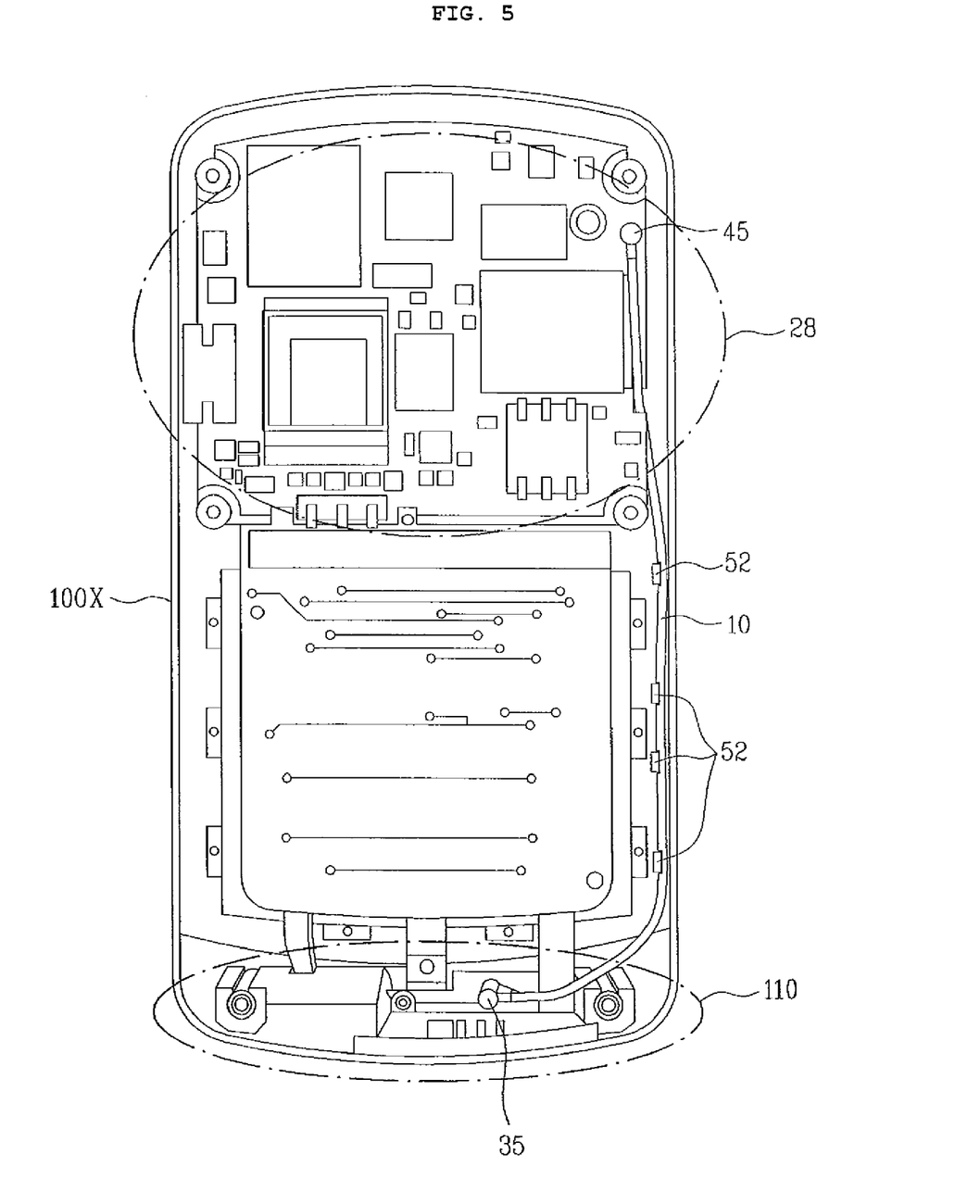
FIG. 5 is a diagram of an interior of a communication terminal according to one embodiment of the present invention.

FIG. 4 is a perspective diagram of one example of a coaxial cable provided to a communication terminal according to one embodiment of the present invention, and FIG. 5 is a diagram of one example of an interior of a communication terminal according to one embodiment of the present invention.

Referring to FIG. 4 and FIG. 5, a first conducting wire 12 is provided to a center (or center portion) of a coaxial cable 10. The first conducting wire 12 is formed of a material having good electric conductivity. Preferably, the first conducting wire 12 is formed of Cu. And, the first conducting wire 12 plays a role in carrying an electric signal such as an RF signal. Moreover, the first conducting wire 12 is connected to first and second connecting portions 35 and 45 shown in FIG. 5.

An inner insulating layer 14 is provided outside the first conducting wire 12. The inner insulating layer 14 is provided to enclose an outer circumference of the first conducting wire 12. The inner insulating layer 14 is formed of such a material for insulation as resin and the like. The inner insulating layer 14 insulates the first conducting wire 12 from a second conducting wire 16 to avoid electric interference in-between. So, a signal can be transferred relatively stably against external jamming or noise.

The second conducting wire 16 is provided outside the inner insulating layer 14. The second conducting wire 16 is configured to enclose the inner insulating layer 14. Preferably, the second conducting wire 16 can be configured in a net pattern.

The second conducting wire 16 is formed of such a material having good electric conductivity as Cu, Al, and the like.

The second conducting wire 16 is electrically conductive and usable as a path for carrying an electric signal. Hence, two kinds of electric signals can be simultaneously transferred between the wireless communication unit 110 and a PCB part 28 due to the first and second conducting wires 12 and 16 provided within the coaxial cable.

Besides, the second conducting wire 16 is connected to a grounding part and plays a role as a shield to prevent an externally incoming electric wave or noise from being introduced into the first conducting wire 12.

An outer insulating layer 18 is provided outside the second conducting wire 16. The outer insulating layer 18 is formed of resin or the like as good as the inner insulating layer 14. The outer insulating layer 18 cuts off to protect the first conducting wire 12, the inner insulating layer 14 and the second conducting wire 16 within the coaxial cable 10 from an external environment.

One or a plurality of penetration holes 20 can be configured to be penetrated in a longitudinal direction within the inner insulating layer 14. Each of the penetration holes 20 is filled up with air to play a role in preventing electric wave interference between the first and second conducting wires 12 and 16.

In particular, the electric wave interference between the first and second conducting wires 12 and 16 is primarily prevented by the inner insulating layer 14 and secondarily prevented by the penetration holes 20.

As mentioned in the foregoing description, the grounding is completed by connecting the second conducting wire 16 to the grounding part. In the following description of a grounding method, a case of a communication terminal is used as a grounding part without providing a separate grounding part within the communication terminal. However, a separate grounding part can also be used as needed.

FIG. 5 is a diagram of one example of an interior of a communication terminal according to one embodiment of the present invention, in which the second body 100B of the communication terminal shown in FIG. 2 or FIG. 3 is shown.

In the following description, a case is indicated by '100X' instead of being discriminated into a front case and a rear case. This is not to limit a position of a grounding part. Thus the case 100X can represent the first and/or second case.

In order to ground a communication terminal using the case 100X of the terminal as a grounding part, the second conducting wire 16 is grounded to a portion of an inner face of the case.

In order to ground the second conducting wire 16 to the portion of the inner face of the case, at least one recessed portion 22 (FIG. 4) is formed to the coaxial cable 10. If necessary, a plurality of recessed portions 22 can be formed. In particular, a portion of the outer insulating layer 18 is removed to form the recessed portion 22 in a manner that the second conducting wire 16 is externally exposed via the removed portion. So, the portion exposing the second conducting wire 16 through the removed portion of the outer insulating layer 18 is also referred to as the recessed portion 22.

When the coaxial cable 10 is fixed within the case 100X, a fixing portion 52 provided to an inner face of the case 100X is fitted into the recessed portion 22 to adhere closely thereto.

Thus, the second conducting wire 16 exposed via the recessed portion 22 comes into contact with the fixing portion 52 to enable the whole case to function as the grounding part.

The case 100X can be formed of one of various materials. To perform a grounding function in a manner of being connected to the coaxial cable provided to the communication terminal according to the present invention, the case 100X is preferably formed of a metal based material.

According to one example, the fixing portion 52 is configured to be projected from the inner face of the case 100X. The fixing portion 52 is projected inward from the case 100X to enable the coaxial cable 10 to be fixed to the case 100X. The fixing portion 52 can be configured in various shapes and/or sizes for enabling the coaxial cable 10 to be fixed thereto.

The fixing portion 52 can be integrally formed with the case 100X. The fixing portion 52 is configured to come into contact with the second conducting wire 16 of the coaxial cable 10, whereby the whole case 100X can play a role as the grounding part.

Electronic parts are provided within the case 100X to operate the communication terminal.

First of all, the wireless communication unit 110 is provided to one side within the case 100X. The wireless communication unit 110 plays a role in receiving electric signals, e.g., signal that are transmitted by an external base station or a satellite.

The first connecting portion 35 is provided to one side of the wireless communication unit 110. The first connecting portion 35 plays a role in electrically connecting the coaxial cable 10 and the wireless communication unit 110 together.

Preferably, the first connecting portion 35 is configured to electrically communicate with the first conducting wire 12 of the coaxial cable 10.

The PCB part 28 is provided within the case 100X. The PCB part 28 provides a place where the parts for various operations of the communication terminal can be loaded. And, the PCB part 28 plays a role in electrically connecting the respective parts together.

The second connecting portion 45 is provided to one side of the PCB part 28. The second connecting portion 45 plays a role in electrically connecting the coaxial cable 10 and the PCB part 28 together.

In the above-explained method, if the case 100X is configured metallic, it can be used as a grounding part. Yet, if the case 100X is not formed of metal, it is unable to play a role as a grounding part. In this case, a separate grounding part is provided within the communication terminal.

Figure 6:
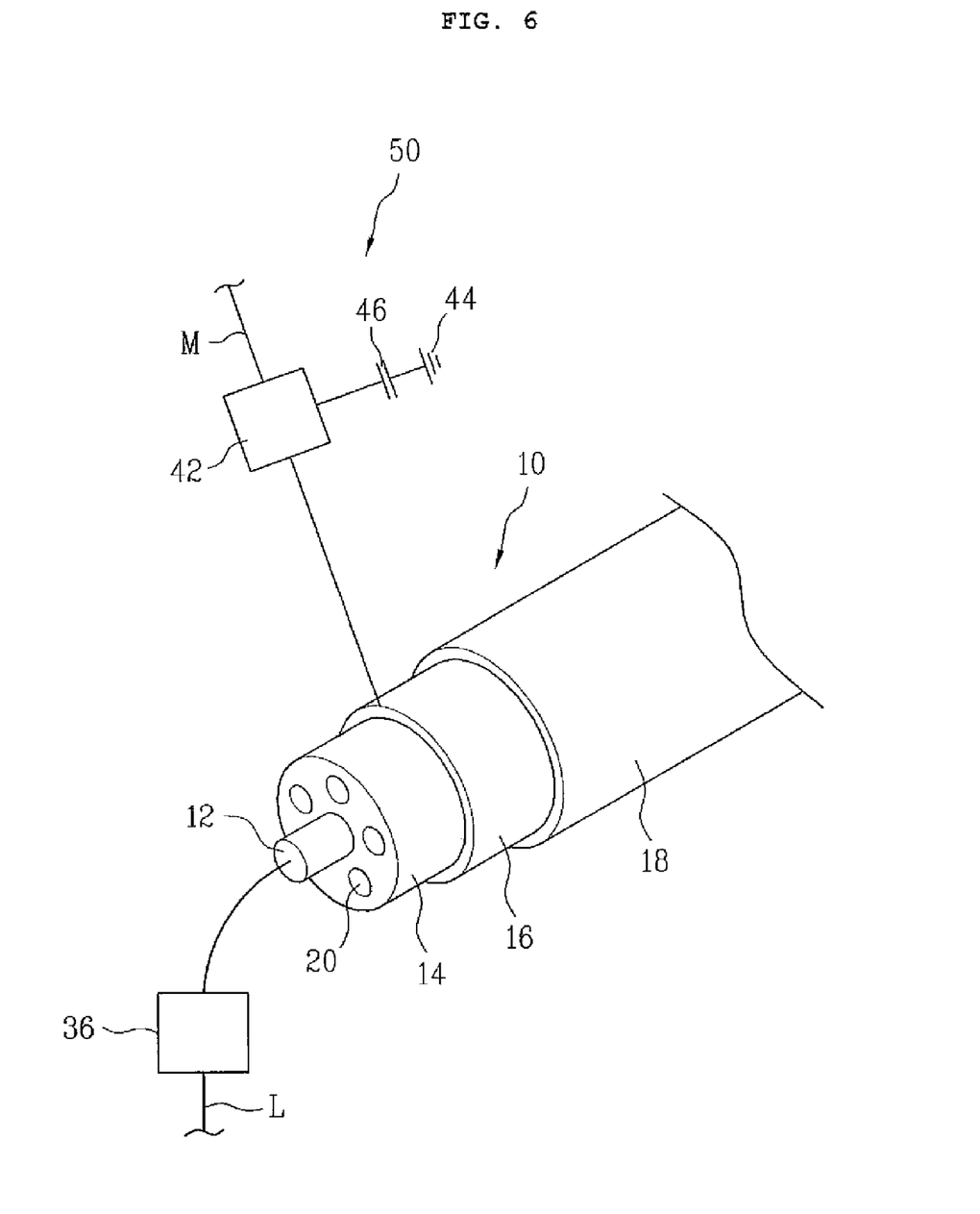
FIG. 6 is a perspective diagram of a coaxial cable assembly provided to a communication terminal according to one embodiment of the present invention.
Figure 7:
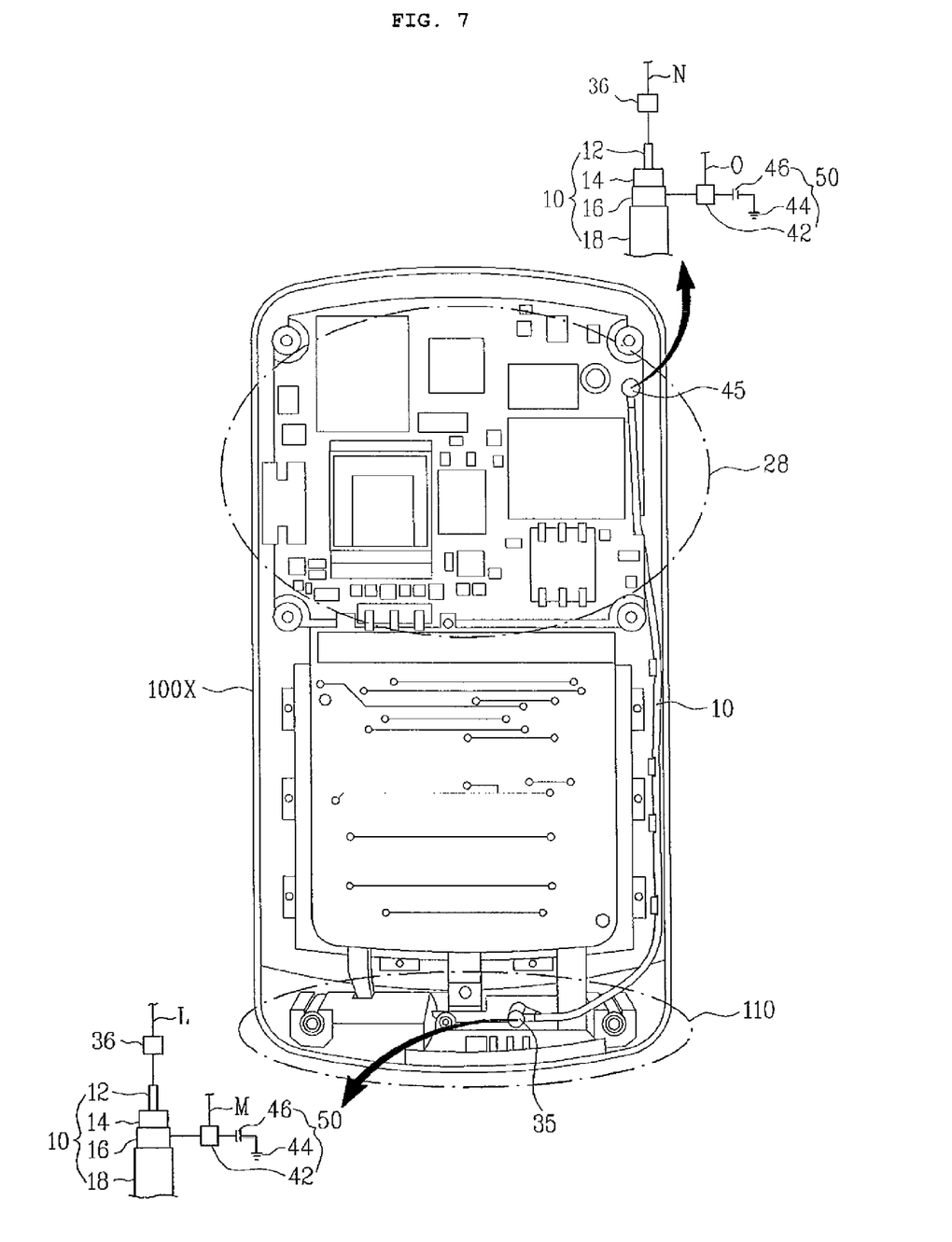
FIG. 7 is a diagram of an interior of a communication terminal provided with the coaxial cable assembly shown in FIG. 6 according to one embodiment of the present invention.

FIG. 6 is a perspective diagram of one example of a coaxial cable assembly provided to a communication terminal according to one embodiment of the present invention. The coaxial cable assembly shown in FIG. 6 includes a coaxial cable, a grounding part, and the like. FIG. 7 is a diagram of one example of an interior of a communication terminal provided with the coaxial cable assembly shown in FIG. 6 according to one embodiment of the present invention. The aforesaid descriptions of the conducting wires and insulating layers are applicable to the following description in common.

A first connecting end portion 36 can be provided to each of both ends of the first conducting wire 12. A wire L is electrically connected to one end of the first connecting end portion 36. The first connecting end portion 36 plays a role in enabling an electric signal, which is carried from the wire L by the first conducting wire 12, to be delivered to another wire N disposed at the other first connecting end portion 36.

The first connecting wire 12 plays a role in carrying an electric signal. In particular, the first conducting wire 12 can be configured to carry a signal such as an RF signal.

The inner insulating layer 14 plays a role in insulating the first conducting wire 12 from the second conducting wire 16 which is explained as follows.

The second conducting wire 16 plays a role in carrying an electric signal. Yet, since the second conducting wire 16 is able to carry a signal different from the electric signal carried by the first conducting wire 16, it is able to reduce the number of cables needed within the communication terminal to provide the necessary electrical connections.

For example, in the electric signals carried by the coaxial cable provided to the communication terminal according to the present invention, if an electric signal carried by the first conducting wire 12 is an RF signal, the other electric signal carried by the second conducting wire 16 can be power or the like. Preferably, different types of electrical signals are carried respectively by the first and second conducting wires 12 and 16 and are processed by different components. Further, the different types of electrical signals can be carried simultaneously or one at a time respectively by the first and second conducting wires 12 and 16. In another example, the same electrical signal can be carried simultaneously by both the first and second conducting wires 12 and 16.

A circuit part 50 is provided to one end of the second conducting wire 16. For instance, the circuit parts 50 are provided respectively to both ends of the second conducting wires 16. The circuit part 50 enables the second conducting wire 16 to prevent the first conducting wire 12 from being affected by external electric waves while a different electric signal flows through the second conducting wire 16.

A second connecting end portion 42 is provided to the circuit part 50. For instance, the second connecting end portions 42 are respectively provided to the circuit parts 50 at both ends of the second connecting wire 16. A separate wire M for carrying an electric signal flowing via the second connecting wire 16 can be provided to one end of the second connecting end portion 42.

A grounding part 44 is provided to the circuit part 50. The grounding part 44 is connected to the second connecting end portion 42, thereby enabling the second connecting wire 16 to play a role in cutting off external electric waves and the like from the first connecting wire 12.

A capacitor 46 is provided to the circuit part 50. The capacitor 46 is provided between the second connecting end portion 42 and the ground part 44. And, the capacitor 46 enables the second connecting wire 16 to stably play a role as a connecting wire for carrying one electric signal and a shielding layer role in cutting off external electric waves and the like from the first connecting wire 12.

In particular, if the capacitor 46 is set to have a prescribed value suitable for a frequency of an RF signal, the second connecting wire 16 is grounded by carrying an electric signal in radio frequency view point from the first conducting wire 12.

For instance, if a frequency of an RF signal is 800 MHz, the capacitor 46 can be set to a value within a range between 100 pF and 1 nF.

Hence, the second conducting wire 16 is able to play a role as a shielding part preventing the first conducting wire 12 from being affected by external electric waves and the like. Of course, the second connecting wire 16 is cable to carry an electric signal while playing a role as the shielding part.

FIG. 7 is a diagram of one example of an interior of a communication terminal provided with the coaxial cable assembly shown in FIG. 6 according to one embodiment of the present invention.

Referring to FIG. 7, the first connecting portion 35 is provided to the wireless communication unit 110 within the communication terminal. The first connecting portion 35 is configured to communicate with the first conducting wire 12 electrically and enables an electric signal received from the wireless communication unit 110 to be transferred to the PCB part 28 and the like via the first connecting wire 12.

The circuit part 50 is provided to one side of the wireless communication unit 110. The circuit part 50 is configured to electrically communicate with the second connecting wire 16 of the coaxial cable 10.

The second connecting end portion 42, the grounding part 44 and the capacitor 46 can be provided to the circuit part 50. The wire M and the grounding part 44 are connected in parallel to the second connecting end portion 42. The capacitor 46 is installed between the second connecting end portion 42 and the wire M. And, the wire M can be configured to electrically communicate with a power supply unit (e.g., the power supply unit 190) provided within the case 100X. If so, both the function of supplying power (a sort of an electric signal) and the grounding function can be simultaneously carried out via the second connecting wire 16.

The PCB part 28 is provided to one side within the case 100X. The PCB part 28 provides a space for loading parts for various operations of the communication terminal and plays a role in enabling the respective parts to electrically communicate with each other.

In the PCB part 28, the first connecting end portion 36 is provided to the second connecting portion 45. The first connecting end portion 36 is configured to electrically communicate with the first connecting wire 12 to receive an RF signal carried along the wireless communication unit 110.

Meanwhile, the circuit part 50 is provided to the second connecting end portion 42 of the PCB part 28.

The circuit part 50 is provided with the second connecting end portion 42, the grounding part 44, the capacitor 46, and the wire O. The circuit part 50 is installed in a manner that a power signal introduced via the wire M from the power supply unit is carried by the second connecting wire 16 to the wire O.

Operations of the above-configured communication terminal including the coaxial cable according to an embodiment of the present invention are explained in detail as follows.

First of all, if a user activates or turn on the power of the communication terminal, an electric signal, and more particularly, an RF signal is received by the wireless communication unit 110 of the communication terminal from an external source such as a base station or a satellite.

The RF signal received by the wireless communication unit 110 is forwarded to the PCB part 28 for a prescribed operation. In doing so, the RF signal is carried by the coaxial cable 10. In particular, the RF signal is carried by the first connecting wire 12.

In this case, the RF signal carried by the first connecting wire 12 is protected by the second connecting wire 16 of the coaxial cable 10 from being affected by an external electric wave and the like.

In particular, if the capacitor 46 is set to a prescribed value against the RF signal carried by the first connecting wire 12, the second connecting wire 16 is grounded against the first connecting wire 12 by RF. So, the second connecting wire 16 is able to play a role in preventing the external electric weave and the like from being introduced into the first connecting wire 12. Also the inner insulating layer 14 helps to insulate the first connecting wire 12 from the second connecting wire 16.

The RF signal carried by the first connecting wire 12 of the coaxial cable 10 is forwarded to a prescribed position of the PCB part 28 to enable the appropriate part(s) of the communication terminal to operate in accordance with the forwarded signal.

Meanwhile, a power signal of the power supply unit (e.g., the power supply unit 190) is forwarded to the second connecting end portion 42 of the circuit part 50 along the wire M.

The power signal forwarded to the second connecting end portion 42 is transferred along the second connecting wire 16 of the coaxial cable 10.

The power signal carried by the second connecting wire 16 of the coaxial cable 10 is forwarded to the second connecting end portion 42 of the circuit part 50 of the PCB part 28. The power signal forwarded to the second connecting end portion 42 of the circuit part 50 is transferred to a prescribed position along the wire O to supply power thereto.

Thus, the electric signal received by the wireless communication unit 110 is forwarded to the coaxial cable 10 via the first connecting portion 35. In this case, as the first connecting portion 35 is connected to the first connecting wire 12 of the coaxial cable 10, the electric signal is carried by the first connecting wire 12.

In this case, as the second connecting wire 16 of the coaxial cable 10 is grounded to the grounding part provided to the communication terminal, the electric signal carried by the first connecting wire 12 is stably forwarded to the second connecting portion 45 by being protected from external electric waves and the like, and any interference from the second connecting wire 16.

The electric signal forwarded to the second connecting portion 45 is transferred to a prescribed position of the PCB part 28 to enable the communication terminal to operate in accordance with the transferred electric signal.

The present invention can provide one or more coaxial cables described above as needed in a communication terminal. Further as a variation, more than two coaxially-disposed connecting wires may be provided in a co-axial cable. For instance, first, second and third connecting wires coaxially disposed may be provided in the coaxial cable to transmitting various different types of electrical signals. In such a case, insulating layers may be coaxially disposed between the connecting wires of the coaxial cable.

Accordingly, the present invention provides the following effects or advantages.

First of all, the present invention enables at least two kinds of electric signals to be forwarded via a coaxial cable capable of carrying one or more electric signals, thereby simplifying wires within a communication terminal.

Secondly, the present invention improves performance in cutting off certain electric waves and thus improves the overall performance of the communication terminal.

It will be apparent to those skilled in the art that various modifications and variations can be made in a communication terminal capable of performing video and/or audio communication using real-time data according to embodiments of the present invention without departing from the spirit or scope of the inventions. Thus, it is intended that the present invention covers the modifications and variations of this invention provided they come within the scope of the appended claims and their equivalents.

What is claimed is:

1. A communication terminal comprising:
a case;
a wireless communication unit provided in a lower part of the case;
a printed circuit board (PCB) part provided in an upper part of the case; and
a coaxial cable including:
a first connecting wire;
an inner insulating layer configured to enclose at least a part of the first connecting wire;
a second connecting wire configured to enclose at least a part of the inner insulating layer; and
an outer insulating layer configured to enclose at least a part of the second connecting wire and to expose a portion of the second connecting wire,
wherein the coaxial cable connects the wireless communication unit and the PCB part, and an inner surface of the case includes at least one fixing portion to fix the coaxial cable thereto, and
wherein the outer insulating layer includes at least one recessed portion to expose the portion of the second connecting wire externally, and the at least one of the fixing portion to fix the coaxial cable is fitted into the at least one recessed portion.

2. The communication terminal of claim 1, wherein the fixing portion is integrally formed with the case.

3. The communication terminal of claim 1, wherein the case is formed of a metal based material having electric conductivity.

4. The communication terminal of claim 1, wherein the first and second connecting wires of the coaxial cable carry different types of electrical signals, respectively.

5. A communication terminal comprising:
a case;
a wireless communication unit provided in a lower part of the case;
a printed circuit board (PCB) part provided in an upper part of the case; and
a coaxial cable including:
a first connecting wire;
an inner insulating layer configured to enclose at least a part of the first connecting wire;
a second connecting wire configured to enclose at least a part of the inner insulating layer; and
an outer insulating layer configured to enclose at least a part of the second connecting wire and to expose a portion of the second connecting wire,
wherein the coaxial cable connects the wireless communication unit and the PCB part, and an inner surface of the case includes at least one fixing portion to fix the coaxial cable thereto, and
wherein the inner insulating layer of the coaxial cable includes a plurality of penetration holes extending in a longitudinal direction.

6. A communication terminal comprising:
a first body having a display module;
a second body having a power supply unit;
a slide module provided between the first and second bodies, the slide module enabling the first and second bodies to be slidably assembled;
a wireless communication unit provided in a lower part of the second body;
a printed circuit board (PCB) part provided in an upper part of the second body and being spaced apart from the wireless communication unit; and
a coaxial cable including:
a first connecting wire;
an inner insulating layer configured to enclose at least a part of the first connecting wire;
a second connecting wire configured to enclose at least a part of the inner insulating layer; and
an outer insulating layer configured to enclose at least a part of the second connecting wire and to expose a portion of the second connecting wire,
wherein the coaxial cable connects the wireless communication unit and the PCB part, the coaxial cable is fixed to an inner side surface of the second body, and the first and second connecting wires of the coaxial cable carry different types of electrical signals, respectively, and
wherein the inner insulating layer includes a plurality of holes extending along the coaxial cable.

7. The communication terminal of claim 6, wherein the inner side surface of the second body includes at least one fixing portion integrally formed with a case of the second body to fix the coaxial cable thereto.

8. The communication terminal of claim 7, wherein the case is formed of a metal based material having electric conductivity.

9. The communication terminal of claim 7, wherein the second connecting wire is connected to a grounding part provided in the case.

10. The communication terminal of claim 9, wherein the grounding part is the inner side surface of the case and is formed of a metal based material having electric conductivity.

11. The communication terminal of claim 6, wherein the second body has at least one manipulating unit.

12. The communication terminal of claim 6, wherein the power supply unit is loaded in a rear part of the second body.

13. The communication terminal of claim 6, wherein the power supply unit is loaded in a lower part of the second body.

14. A communication terminal comprising:
   at least one body having a housing;
   a coaxial cable assembly including:
      a first connecting wire;
      an inner insulating layer configured to enclose at least a part of the first connecting wire;
      a second connecting wire configured to enclose at least a part of the inner insulating layer;
      an outer insulating layer configured to enclose at least a part of the second connecting wire; and
      at least one circuit part connected to the second connecting wire to cut off electric waves, the at least one circuit part being provided in the at least one body;
   a wireless communication unit provided in the at least one body;
   a printed circuit board (PCB) part including a plurality of electronic parts provided in the at least one body, the PCB part being spaced apart from the wireless communication unit; and
   a power supply unit provided in the at least one body,
   wherein the first connecting wire electrically connects the wireless communication unit and the PCB part, the second connecting wire electrically connects the power supply unit and the PCB part, and the coaxial cable assembly is fixed to an inner side surface of the housing of the at least one body by at least one fixing portion integrally formed with the inner side surface of the housing of the at least one body, and
   wherein the inner insulating layer includes a plurality of penetration holes extending in a longitudinal direction.

15. The communication terminal of claim 14, wherein the at least one fixing portion is formed on an inner side surface of the housing of the body in a longitudinal direction of the inner side surface of the housing of the body at predetermined intervals.

16. The communication terminal of claim 14, wherein the circuit part includes:
   a grounding part connected to the second connecting wire to ground the second connecting wire; and
   a capacitor provided between the second connecting wire and the grounding part.

17. The communication terminal of claim 16, wherein the at least one circuit part further includes:
   a connecting portion between the second connecting wire and the capacitor; and
   a different wire is connected in parallel to the connecting portion.

18. The communication terminal of claim 14, wherein the first connecting wire carries an RF signal and the second connecting wire carries a power signal.

19. The communication terminal of claim 14, wherein the at least one circuit part includes:
   a first circuit part provided at a first end portion of the second connecting wire; and
   a second circuit part provided at a second end portion of the second connecting wire,
   wherein at least one of the first and second circuit parts includes:
      a grounding part connected to the second connecting wire to ground the second connecting wire; and
      a capacitor provided between the second connecting wire and the grounding part.

20. A communication terminal comprising:
   at least one body having a housing;
   a coaxial cable assembly including:
      a first connecting wire;
      an inner insulating layer configured to enclose at least a part of the first connecting wire;
      a second connecting wire configured to enclose at least a part of the inner insulating layer;
      an outer insulating layer configured to enclose at least a part of the second connecting wire; and
      at least one circuit part connected to the second connecting wire to cut off electric waves, the at least one circuit part being provided in the at least one body;
   a wireless communication unit provided in the at least one body;
   a printed circuit board (PCB) part including a plurality of electronic parts provided in the at least one body, the PCB part being spaced apart from the wireless communication unit; and
   a power supply unit provided in the at least one body,
   wherein the first connecting wire electrically connects the wireless communication unit and the PCB part, the second connecting wire electrically connects the power supply unit and the PCB part, and the coaxial cable assembly is fixed to an inner side surface of the housing of the at least one body by at least one fixing portion integrally formed with the inner side surface of the housing of the at least one body, and
   wherein the outer insulating layer includes a recess that exposes an outer surface of the second connecting wire, and the recess receives that at least one fixing portion to fixedly dispose the coaxial cable assembly in the communication terminal.

21. A communication terminal comprising:
   a coaxial cable comprising:
      a first connecting wire;
      an inner insulating layer configured to enclose at least a part of the first connecting wire;
      a second connecting wire configured to enclose at least a part of the inner insulating layer; and
      an outer insulating layer configured to enclose at least a part of the second connecting wire and to expose a portion of the second connecting wire; and
   a case having a part in contact with the exposed portion of the second connecting wire,
   wherein the outer insulating layer includes at least one recessed portion to expose the portion of the second connecting wire externally, and an inner surface of the case includes at least one fixing portion to fix the coaxial cable thereto by being fitted into the at least one recessed portion.

* * * * *